March 6, 1945. E. R. CAPITA 2,370,775
APPARATUS FOR APPLYING FLUX AND THE LIKE
Filed Dec. 12, 1941
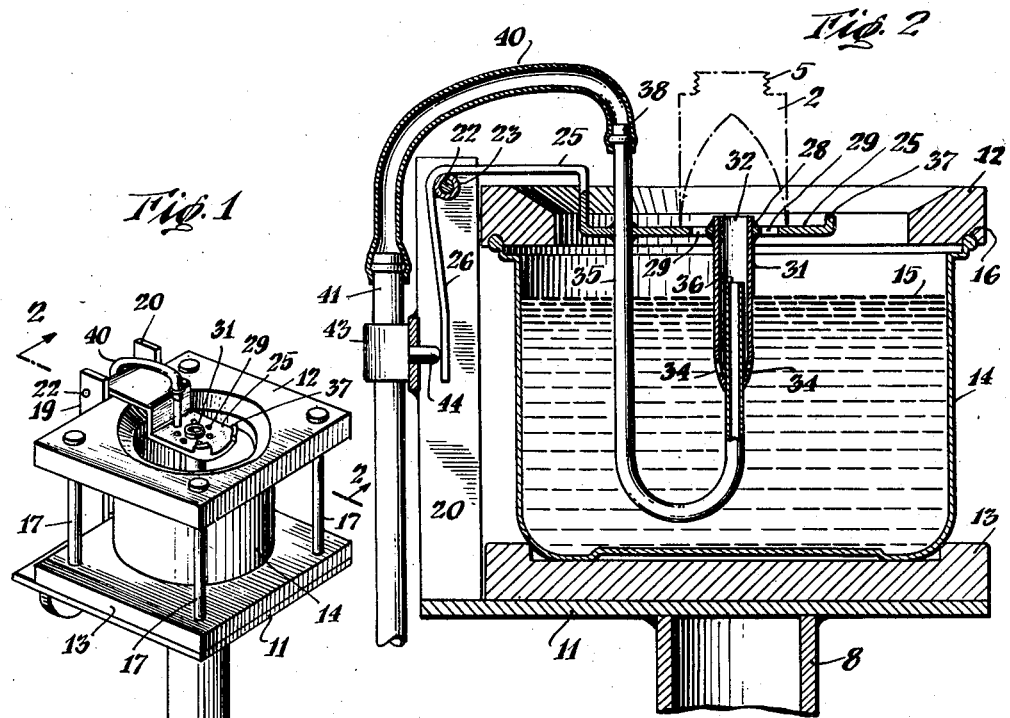
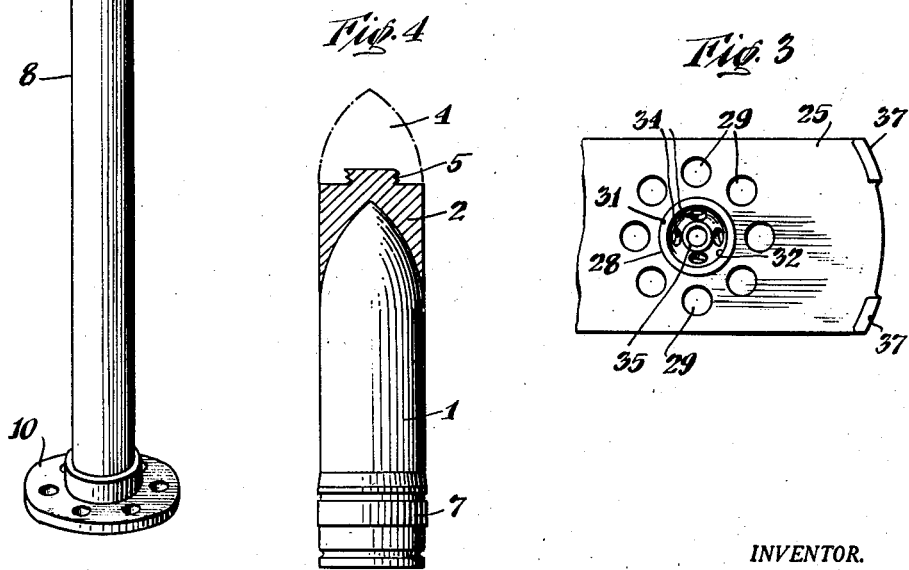
INVENTOR.
Emil R. Capita
BY
Norman J. Holland
ATTORNEY Patented Mar. 6, 1945

2,370,775

UNITED STATES PATENT OFFICE 2,370,775

APPARATUS FOR APPLYING FLUX AND THE LIKE

Emil R. Capita, Flushing, N. Y.

Application December 12, 1941, Serial No. 422,703

12 Claims. (Cl. 91—45)

The present invention relates to the application of flux to articles prior to the application of solder thereto and to a device which is particularly useful in applying flux to parts of armor piercing projectiles.

Armor piercing projectiles generally comprise a shell case having the point thereof fitted with a separate steel cap. The separate cap is the first effective part of a projectile to strike a piece of armor plate. A copper rotating band fitted around the base of the shell case gives the projectile a whirl as it passes through a gun barrel and prevents it from tumbling over and over while in flight; this causes the armor piercing end of the projectile to strike the target first. A second cap of streamline shape is usually fitted over the end of the armor piercing cap to minimize wind resistance during the flight of a projectile. The armor piercing cap and shell case are generally attached to each other by soldering them together.

In instances where metal parts to be joined by soldering or welding, it is desirable that the surfaces to be joined be coated with a substance that will clean them and free them from oxide. Such substances are called fluxes; they promote a union of metals. The flux may be applied just prior to or during the actual soldering or welding operations and may be in solid, granulated or liquid form.

Previous and usual practice has been to apply flux to articles either in the form of powder or by painting it on with a brush. These methods are relatively slow and expensive and the quantity of articles that can be coated with flux by the methods in a given time is limited. The method is even slower and more difficult in cases where concave or hollow articles such as the caps of armor piercing projectiles must be coated with flux at their interiors. In many cases the flux is not applied evenly and parts of the surfaces may not be coated at all, thus impairing the final soldering or welding operation.

The present invention aims to overcome or minimize the above and other difficulties and disadvantages by providing a new and improved means for applying flux to articles and particularly to concave or hollow articles such as the caps of armor piercing projectiles.

An object of the present invention is to provide a new and improved flux applying means.

Another object of the present invention is to provide a new and improved means for applying flux to parts of armor piercing projectiles.

Another object of the present invention is to provide a new and improved flux applying means which is more nearly automatic in operation.

Another object of the present invention is to provide a new and improved means for spraying flux onto articles.

Another object of the present invention is to provide a new and improved flux applying means which is relatively simple in construction and operation.

Another object of the invention is to provide a flux applying means which may be used to coat relatively large numbers of articles with flux in a short time.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a perspective view of a preferred embodiment of the invention;

Fig. 2 is a sectional view taken along the line 2—2 of Fig. 1;

Fig. 3 is a fragmentary top plan view of an article supporting member; and

Fig. 4 is a diagrammatic view, partly in section, illustrating the parts of an armor piercing projectile to which flux may be applied by the present invention.

Referring again to the drawing, and more particularly to Fig. 4 thereof, there is illustrated one type of armor piercing projectile. The projectile illustrated comprises a shell case 1 having an armor piercing cap 2 fitted over the pointed front end thereof. The armor piercing cap 2 has a concave or hollow shape at one side thereof so that it may fit closely over the pointed front end of the shell case 1. The shell case 1 and cap 2 are usually soldered together. A streamlined nose cap 4 may be screwed or otherwise secured to a projection 5 located at the front end of the armor piercing cap 2 to minimize air resistance to the projectile during flight. A rotating band 7, which gives the shell a whirl as it passes through a gun barrel, is illustrated adjacent the rear end of the projectile. The present new and improved flux applying means will be described chiefly with reference to applying a flux coating to the interior of the armor piercing cap 2; it will be understood that it may be utilized in applying flux to articles generally.

The device for applying flux to articles is illustrated more particularly in Figs. 1 and 2 of the drawing. One form of supporting framework for the device may comprise an upright column 8 which is secured to an enlarged base portion or foundation 10. The base portion 10 may be attached in any suitable manner to a floor. The upper end of the column 8 is provided with an enlarged top 11 adapted to form a seat for the device. The supporting framework illustrated depicts one convenient form which may be utilized; in certain instances it may be preferable to mount the device upon a bench or table.

The top member 11 forms a seat for a recessed base member 13 which is adapted to receive a container or pot 14 for holding liquid flux. The recessed base member 13 prevents the flux container 14 from sliding in a lateral direction. An apertured holding member 12 having a recess 16 at the underside thereof is adapted to fit over the rim of the container 14 and is preferably secured to the recessed base member 13 and top member 11 by bolts or screws 17. The container 14 is thus securely held against accidental movement in any direction and is adapted to contain the liquid flux with which articles are to be coated.

A second framework comprising a pair of spaced upwardly extending members 19 and 20 connected by a crossbar 22 adjacent their upper ends is provided adjacent one side of the enlarged top member 11. This second framework is adapted to support the mechanism for transferring liquid flux from the container 14 onto an article. The crossbar 22 has fitted thereover a sleeve member 23, to which is attached a platform or article supporting member 25 that extends over the flux container 14. The sleeve member 23 is free to pivot about the cross bar 22 so that the platform or supporting member 25, which is attached to the sleeve, may pivot about the crossbar 22. The article supporting platform 25 has a substantially vertically extending leg 26 at the pivoted end thereof, the purpose of which will be hereinafter described.

The platform or supporting member 25 extends outwardly substantially horizontally over the flux container 14 and is provided with an opening 28 into which is fitted a tubular member 31. A plurality of spaced apertures 29 in the article supporting member 25 are desirable in connection with the operation of the device and will be later described. The tubular member 31 has an open upper end 32 which is preferably firmly secured into the large central opening of the supporting member 25 so that it moves with the supporting member; it may be attached to the platform 25 by welding, soldering or any other convenient means. The tubular member 31 extends downwardly into the flux container 14 and is provided with a plurality of apertures 34 adjacent the lower end thereof adapted to admit liquid flux to the interior of the tubular member 31.

The lower end of the tubular member 31 is closed by one leg of a substantially U-shaped member 35 which extends into the tubular member 31 and is connected with the lower end of the tubular member 31 by soldering, welding, or in any other suitable manner. The opposite end of the U-shaped member 35 extends upwardly through an aperture in and is secured to the supporting member or platform 25. The substantially U-shaped conduit 35 is adapted to supply air under pressure to the interior of a tubular member 31 and to thereby cause liquid flux to be sprayed up through the tubular member 31. An article to be coated with flux may be placed upon the platform 25 so that it extends over the open upper end of the tubular member 31 and the surrounding apertures 29. The upturned portions 37 on the platform 25 are helpful in retaining an article on the platform 25.

The end 38 of the U-shaped conduit, which extends through the supporting member 25, may be connected by a piece of flexible tubing 40 with a compressed air conduit 41. The compressed air conduit 41 connects with a suitable source of compressed air (not shown) and is adapted to supply compressed air to the interior of the tubular member 31, as hereinabove referred to. The compressed air conduit 41 is connected with the source of compressed air at all times and delivery of air therefrom is controlled by means of a valve 43 adapted to open and close the air lines leading to the interior of the tubular member 31. Operation of the valve 43 and opening and closing of the air lines is controlled by an operating projection or member 44. Pressing the member 44 into the valve casing connects the air lines with the source of compressed air and allowing the member 44 to move out of the casing cuts off the air from the source of compressed air. Any suitable type of valve may be utilized; a satisfactory valve is the "Schrader" valve of this type. The valve operating projection 44 may be moved by means of the substantially vertically extending leg 26 that is connected with the platform member 25 and which extends downwardly to a point adjacent the valve projection 44. Up and down movement of the article supporting member 25 in response to pressure of an article on the platform causes horizontal movement of the vertical leg 26 which is in contact with the valve projection 44. This actuates the resiliently mounted projecting member 44 of the valve 43 and either allows air to pass through the compressed air conduit 41 or cuts it off therein. As shown in the drawing when the projection 44 is pressed into the body of the valve 43, air will flow through the conduits into the interior of the tubular member 31. The compressed air rushing through the tubular member 31 tends to create a partial vacuum therein and draws liquid flux from the container 14 up into the tubular member 31; when the liquid flux strikes the stream of compressed air it is broken up into small particles and formed into a spray. An article placed over the end of the tubular member 31 will be coated with a layer or film of liquid flux. Excess air may escape to the atmosphere through the apertures 29 and apertured member 12; excess flux may return to the interior of the container 14 through the apertures 29.

When the article is lifted from the supporting member or platform 25 the valve projection 44 may return to its outermost position and thus interrupt the flow of air through the conduit 41. Interruption of the flow of air through the flexible tubing 40 and U-shaped member 35 to the interior of the tubular member 31 cuts off the partial vacuum within the latter member and stops the formation of the spray of liquid flux. The starting and stopping of the flux spray occurs very rapidly.

When it is desired to operate the device, an article is placed upon the platform 25 so that it extends over the upper end of the tubular member 31 and the surrounding apertures 29. Downward pressure of the article against the supporting plate 25 causes it to pivot about the crossbar 22 and move the operating lever 26 in opposition to the valve projection 44. Movement of the valve projection 44 into the valve casing connects the conduit 41 with the air supply and allows air to flow from the conduit 41 through the flexible tubing 40 and U-shaped conduit 35 into the interior of the hollow member 31. The air rushing out of the conduit 35 and into the tubular member 31 causes a partial vacuum within the latter member and is effective to draw liquid flux into the hollow member 31 through the apertures 34 located adjacent the lower part thereof. When the liquid flux is struck by the air stream which issues from the end of the conduit 35 it is broken up into a spray and ejected out the open end of the conduit 31 against the article located on the platform. Excess air and flux may pass out through the surrounding apertures 29, excess flux dripping back into the flux reservoir 14 and excess air passing freely out the top of the flux reservoir 14. The level of the flux 15 within the container 14 should be above the apertures 34 of the tubular member 31 so that the liquid flux may be drawn into the tubular member 31 through the apertures 34. Also, the level 15 of the liquid flux is preferably maintained below that of the inner end 36 of the U-shaped conduit 35 so that liquid flux will not flow into the U-shaped conduit 35. The coating of an article with flux by means of the present device occurs very rapidly and the article may be removed almost immediately from the supporting platform 25. As the article is lifted from the supporting platform 25 the valve operating projection 44 returns to its normal inoperative position and cuts off the flow of air through the conduit 41. This interrupts the operation of the device. The present device is thus in operation only while an article is being coated with flux.

It will be seen that the present invention provides a new and improved means for applying flux to articles and particularly to articles such as concave caps of armor piercing projectiles. The coating is uniformly and rapidly applied to the entire surface to be coated, thereby assuring a strong and effective joint when the flux covered surface is soldered to another surface. The device is simple in construction and may be readily operated with unskilled labor to apply flux to various articles. It may be easily adapted to mass production coating of articles and shell caps of different sizes and shapes.

As various changes may be made in the form, construction and arrangement of the parts herein without departing from the scope and spirit of the invention and without sacrificing any of its advantages, it is to be understood that all matter herein is to be interpreted as illustrative and not in a limiting sense.

Having thus described my invention, I claim:

1. A device adapted to be used for applying a liquid flux coating to an article to be soldered, comprising, in combination, a container for holding the flux material, a tubular member having one end thereof extending into said container and into said coating material, and a conduit operatively connected with said tubular member with its outlet extending a substantial distance into said tubular member adapted to direct air under pressure through the interior of said tubular member, whereby liquid flux is adapted to be drawn into said tubular member by the partial vacuum created by the air flow and forced out the upper end thereof against an article and means operated by the article to control the flow of air through said conduit.

2. A device of the class described comprising, in combination, a tubular member having one end thereof normally extending into a supply of liquid, a conduit operatively connected with said tubular member for supplying air under pressure thereto, whereby liquid is adapted to be drawn into said tubular member and forced out one end thereof against an article, and a pivotally mounted article supporting member adjacent said end of the tubular member.

3. A device of the class described comprising, in combination, a tubular member having one end thereof normally extending into a supply of liquid, a conduit extending a substantial distance into said tubular member for supplying air under pressure and directing it upwardly through said tubular member whereby liquid is adapted to be drawn upwardly in said tubular member by the partial vacuum created therein and forced out one end thereof against an article by the air stream, a pivotally mounted article supporting member, and means operatively connected with said article supporting member and responsive to the movement of said supporting member about its pivot for controlling the passage of air through said conduit.

4. A device of the class described comprising, in combination, a tubular member having the lower end thereof normally extending into a supply of liquid, a conduit connected with said tubular member for supplying air under pressure thereto whereby liquid is adapted to be drawn into the lower end of said tubular member and forced out the other end thereof against an article, a movable member extending about said other end of the tubular conduit for supporting an article adjacent thereto, and means operatively connected with said movable member for controlling the passage of air through said conduit.

5. A device of the class described comprising, in combination, a tubular member having the lower end thereof normally extending into a supply of liquid, a conduit connected with said tubular member for supplying air under pressure thereto whereby liquid is adapted to be drawn into the lower end of said tubular member and forced out the other end thereof against an article, a pivotally mounted article supporting member extending about said other end of the tubular conduit, and means operatively connected with said pivotally mounted member for controlling the passage of air through said conduit.

6. A device of the class described comprising, in combination, a tubular member having the lower end thereof normally extending into a supply of liquid, a conduit connected with said tubular member for supplying air under pressure thereto whereby liquid is adapted to be drawn into the lower end of said tubular member and forced out the other end thereof against an article, pivotally mounted article supporting member extending about said other end of the tubular conduit having an arm connected therewith and movable in response to movements of said supporting member to actuate an air valve and thereby control the passage of air through said conduit.

7. A device of the class described comprising, in combination, a movable support for an article, a tubular member connected with and extending through said support into a source of coating material, a conduit connected with said support and said tubular member adapted to conduct air to the interior of said tubular member to move coating material through the latter member and direct it against an article on said support and means responsive to the movement of said support for supplying air to said conduit.

8. A device of the class described comprising, in combination, a movable support for an article, a tubular member connected with and extending through said support into a source of coating material, a conduit connected with said support and said tubular member to move coating material through the latter member and direct it against an article on said support, and means connected with said support adapted to control the passage of air through said conduit in response to movements of said support.

9. In a device of the class described, the combination of a container for a liquid flux material, a tubular member having an open upper end extending into the atmosphere and having apertures adjacent the lower end thereof and having the lower end normally extending into the flux material, and a conduit extending downwardly into the container and through one of said apertures and into said tubular member for a substantial distance conducting fluid to the interior thereof, whereby flux material is adapted to be drawn upward in said tubular member by the partial vacuum created by the air stream and ejected with the air stream from the open upper end thereof.

10. A device for applying a liquid flux coating to an article to be soldered, in combination, a tubular member having one end thereof normally extending into a supply of liquid, a conduit operatively connected with said tubular member and extending a substantial distance therein to direct air under pressure upwardly through said tubular member, whereby liquid is adapted to be drawn into said tubular member by the partial vacuum produced by the air flow and forced out one end thereof against an article, and a pivotally mounted article supporting member adjacent said end of the tubular member.

11. A device of the class described comprising, in combination, a tubular member having one end thereof normally extending into a supply of liquid, a conduit operatively connected with said tubular member and extending a substantial distance into said tubular member for directing air under pressure upwardly through said tubular member, whereby liquid is adapted to be drawn upwardly through said tubular member by partial vacuum created by the air stream and forced out one end thereof against an article, and a pivoted article supporting member adjacent said end of the tubular member operatively connected to control the delivery of air to said tubular member and having apertures therein for returning excess liquid to said supply of liquid.

12. In a device of the class described, the combination of a reservoir, a supporting member for an article to be coated with a flux, a tubular member having an open upper end extending through and secured to said article supporting member, and having a lower end normally extending into a reservoir for liquid flux, a U-shaped conduit having one end extending through and connected to said supporting member and the other end connected with said tubular member adjacent the lower end thereof and extending a substantial distance into said tubular member, said conduit being adapted to direct a stream of air through the interior of the tubular member whereby liquid flux is drawn into the lower part thereof by the partial vacuum created, combined with the air stream and ejected from the open upper end thereof against the article on the article supporting member.

EMIL R. CAPITA.